US009505067B1

(12) United States Patent
Nasiell et al.

(10) Patent No.: US 9,505,067 B1
(45) Date of Patent: Nov. 29, 2016

(54) PULL-CORD OPERATED CLAMPING HANDLE TUBING CUTTER TOOL

(76) Inventors: Gustav M. Nasiell, Laguna Woods, CA (US); Leif Hall, Stockholm (SE)

( * ) Notice: Subject to any disclaimer, the term of this patent is extended or adjusted under 35 U.S.C. 154(b) by 197 days.

(21) Appl. No.: 13/066,964

(22) Filed: Apr. 29, 2011

(51) Int. Cl.
*B23D 21/08* (2006.01)
*B23D 21/06* (2006.01)
*B26D 3/16* (2006.01)

(52) U.S. Cl.
CPC ............ *B23D 21/08* (2013.01); *B23D 21/06* (2013.01); *B26D 3/169* (2013.01)

(58) Field of Classification Search
CPC .................. B23D 21/06–21/12; B26D 3/169
USPC ........ 30/93–97, 101–108; 82/46, 70.1, 70.2; D8/60, 61
See application file for complete search history.

(56) References Cited

U.S. PATENT DOCUMENTS

| 18,918 | A | * | 12/1857 | Lloyd | 30/96 |
| 377,725 | A | * | 2/1888 | Thompson | 30/96 |
| 1,279,022 | A | * | 9/1918 | Scott | 30/96 |
| 1,335,660 | A | * | 3/1920 | Conley | 30/96 |
| 1,373,300 | A | * | 3/1921 | Caffrey | 30/96 |
| 2,317,944 | A | * | 4/1943 | Schaefer | 30/96 |
| 2,615,516 | A | * | 10/1952 | Hyde | 30/93 |
| 4,114,266 | A | * | 9/1978 | Erpenbeck | 30/96 |
| D255,642 | S | * | 7/1980 | Erpenbeck et al. | D8/60 |
| 4,574,664 | A | * | 3/1986 | Curry | 81/57.34 |
| 4,769,911 | A | * | 9/1988 | Araki | 30/94 |
| 4,802,278 | A | * | 2/1989 | Vanderpol et al. | 30/97 |
| 5,179,781 | A | * | 1/1993 | Weaver | 30/96 |
| 5,243,760 | A | * | 9/1993 | May, Jr. | 30/97 |
| 5,752,420 | A | * | 5/1998 | Connors | 30/92 |
| 6,065,212 | A | * | 5/2000 | Lazarevic | 30/101 |
| 6,202,307 | B1 | * | 3/2001 | Wrate | 30/101 |
| 6,430,815 | B1 | * | 8/2002 | Wickline | 30/101 |
| 6,637,115 | B2 | * | 10/2003 | Walsh et al. | 30/94 |
| 6,671,962 | B2 | * | 1/2004 | Watamura | 30/96 |
| 7,013,567 | B2 | * | 3/2006 | Myers | 30/101 |
| D568,701 | S | * | 5/2008 | Nasiell | D8/61 |
| D568,702 | S | * | 5/2008 | Nasiell | D8/61 |
| 7,406,769 | B1 | * | 8/2008 | Toussaint | 30/93 |
| 7,743,510 | B2 | * | 6/2010 | Lazarevic | 30/102 |
| 7,845,080 | B2 | * | 12/2010 | Nasiell | 30/101 |
| 8,261,454 | B2 | * | 9/2012 | Wilson, Jr. | 30/97 |
| 2002/0153440 | A1 | * | 10/2002 | Holcomb et al. | 241/169.1 |
| 2005/0076508 | A1 | * | 4/2005 | Green et al. | 30/101 |
| 2007/0050984 | A1 | * | 3/2007 | Bartoluzzi | 30/93 |
| 2009/0165306 | A1 | * | 7/2009 | Nasiell | 30/101 |
| 2009/0199407 | A1 | * | 8/2009 | Lazarevic | 30/95 |
| 2013/0340257 | A1 | * | 12/2013 | Nasiell | 30/97 |

FOREIGN PATENT DOCUMENTS

GB          131194 A  *  8/1919

* cited by examiner

*Primary Examiner* — Jason Daniel Prone
(74) *Attorney, Agent, or Firm* — William L. Chapin

(57) ABSTRACT

A tool for cutting tubing includes a rotary cutting head which has a slot for receiving a tube to be cut, a gear drive mechanism for rotating the cutting head, a clamping handle which extends from the gear drive mechanism, and a pull cord drive wheel mechanism for rotating the gear drive mechanism which includes a pulley, a pull cord wrapped around the pulley, and a retractor spring to rotate the pulley in an opposite direction after it has been rotated in a first direction by pulling on the cord to thus rotate the cutting head to sever a length of tubing. The clamping handle includes a pair of opposed semi-cylindrically-shaped shells which are pivotable apart to receive a length of tubing to be cut, and pivotable to a closed position and compressed by hand pressure to grip the tubing being cut.

9 Claims, 9 Drawing Sheets

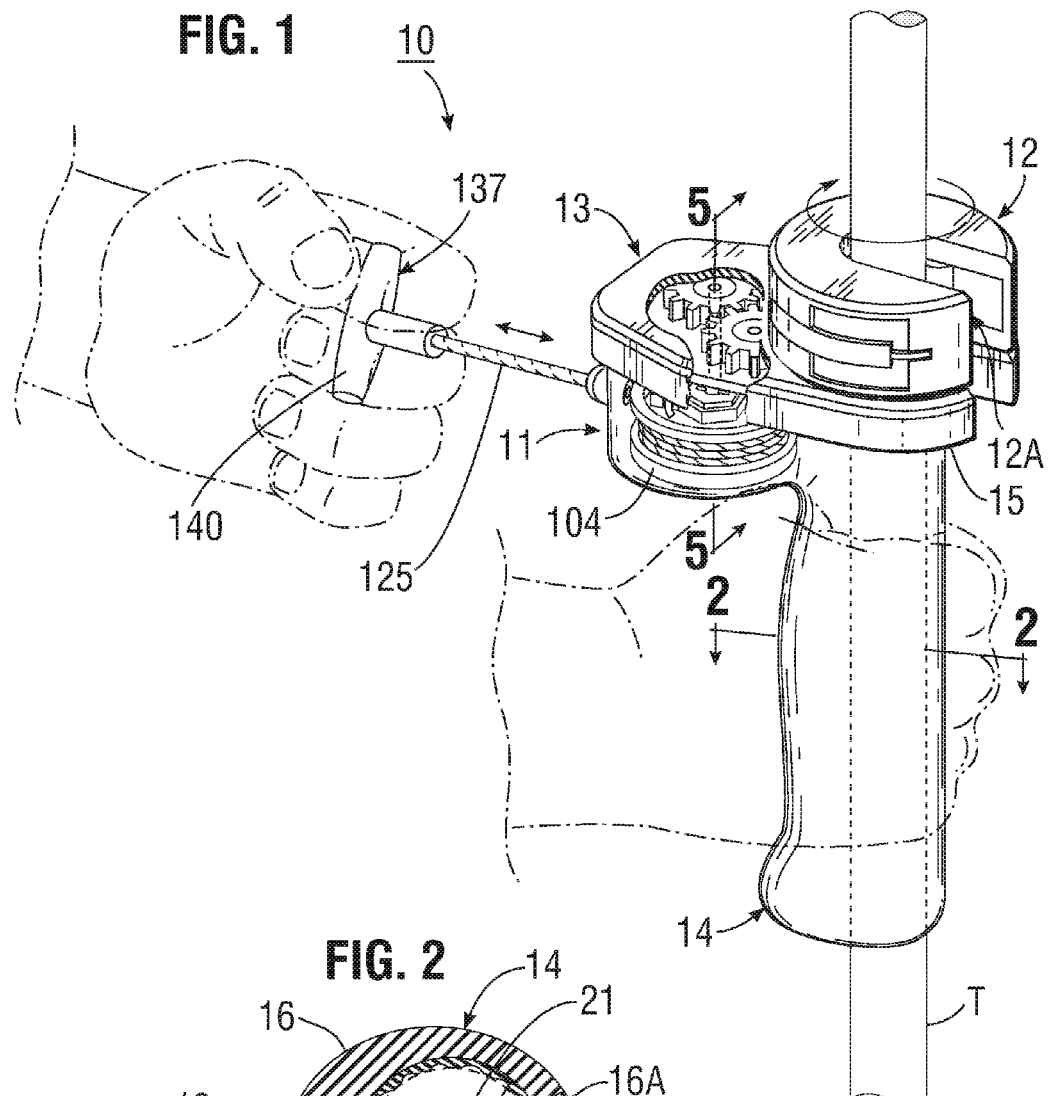
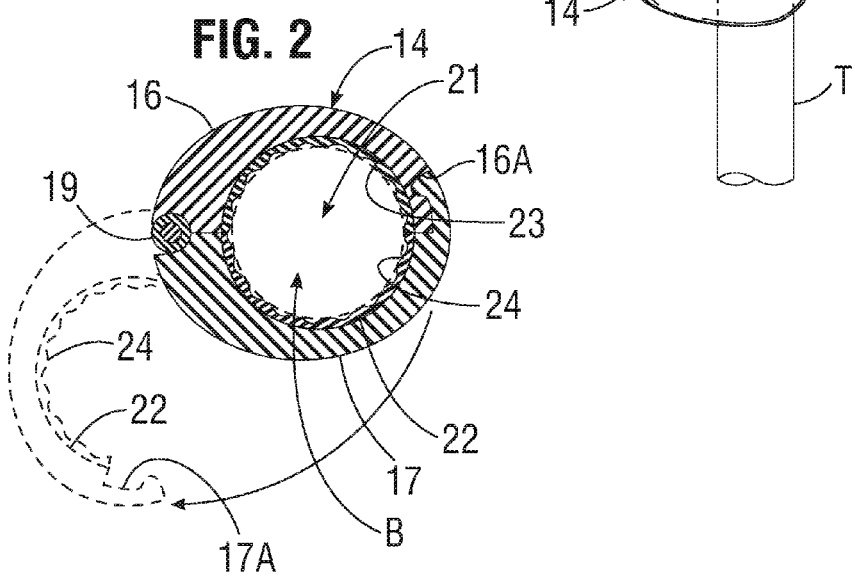

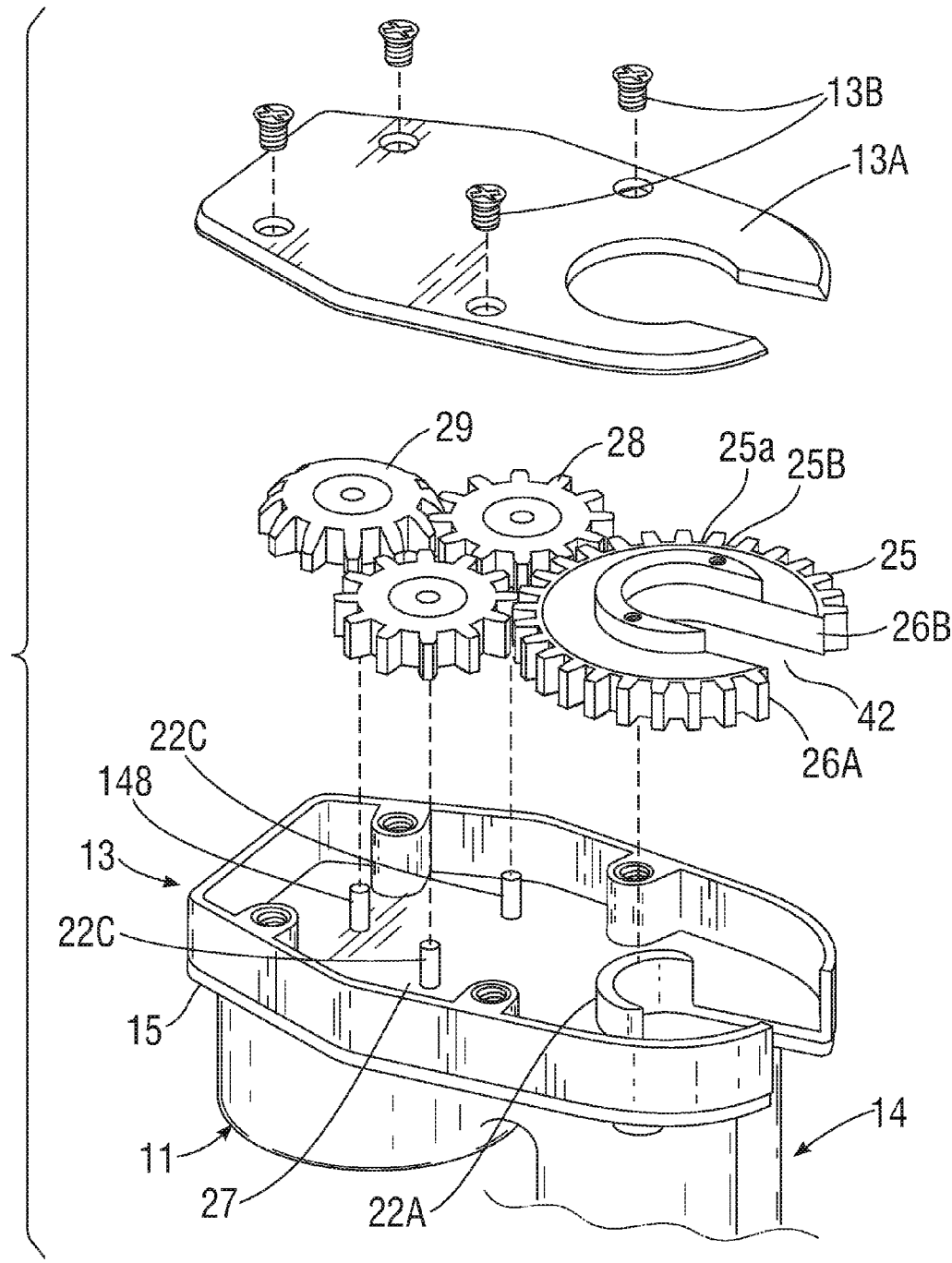

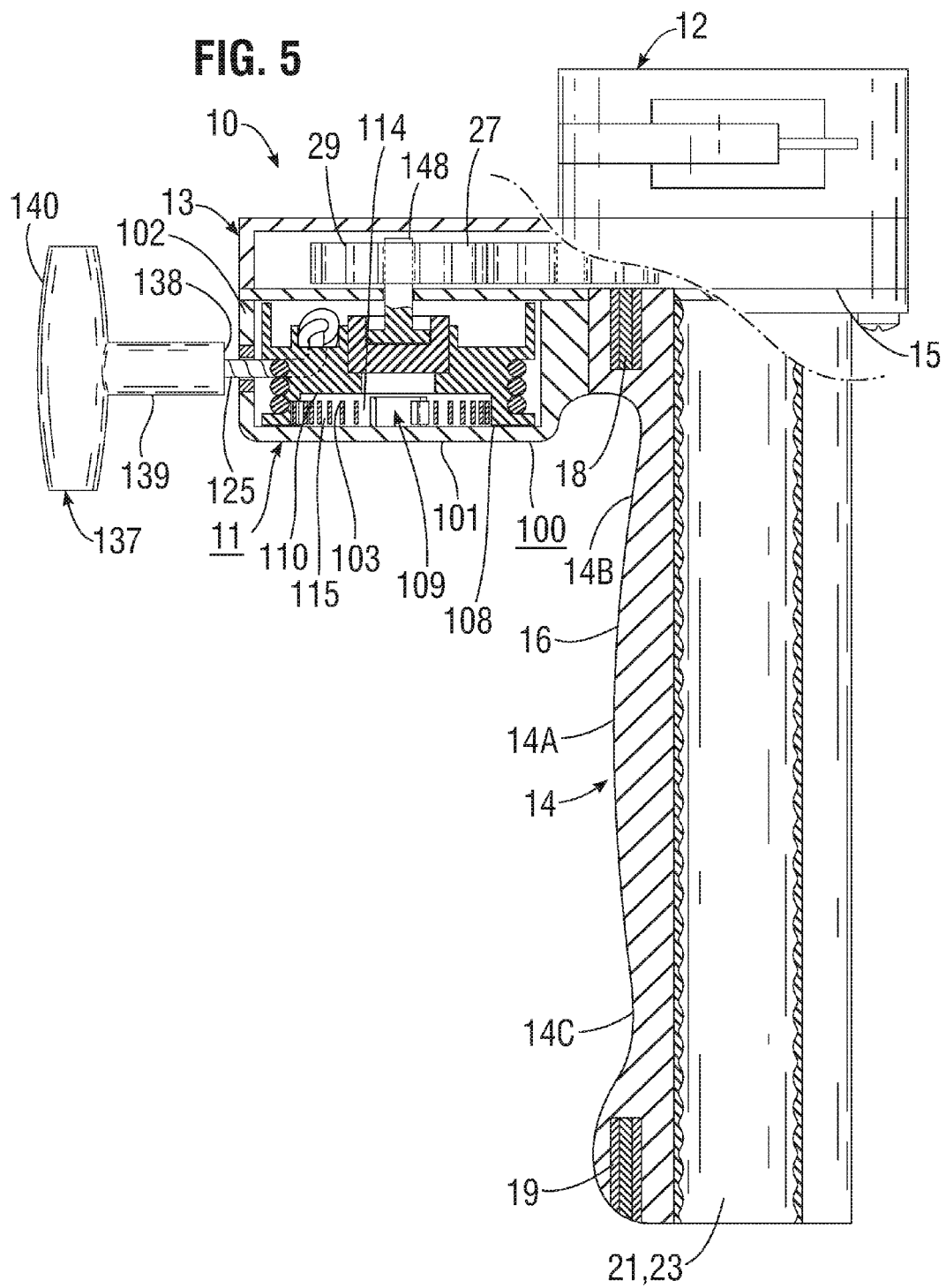

PULL-CORD OPERATED CLAMPING HANDLE TUBING CUTTER TOOL

BACKGROUND OF THE INVENTION

A. Field of the Invention

The present invention relates to hand tools. More particularly, the invention relates to a hand tool for cutting tubular workpieces such as copper tubing used in plumbing systems which is operated by a pull-cord mechanism and thus does not require an electrical or pneumatic power source.

B. Description of Background Art

Plumbing used for hot and cold water service in most contemporary residences and other buildings employs copper tubing to distribute the water to various sites within the building, including bathrooms, showers, kitchens, laundry rooms, etc. At each such site, an elongated length of copper tubing connected to a source such as a water main or hot water heater must be cut to size and connected by a fitting to a water faucet, shower head, toilet tank, or other such fixture.

The number of individual fixture connections and hence number of tubing cuts which must be made during original construction or retrofitting of a building can be substantial. For example, an average full bathroom with a single sink and shower head requires at least 5 separate tubing cuts, and adding another sink increases the total to 7 cuts. Each additional bathroom adds 5 to 7 cuts, the kitchen adds at least 2 cuts for a sink and another 1 or 2 more cuts for a water purifier.

For residences which include a laundry room and/or one or more additional bathrooms, the number of cuts increases by 2 to 7 for each such additional site. Thus, as a bare minimum, even a very small apartment construction requires cutting at least 7 different lengths of copper tubing. A more typical apartment with 2 full baths, each having a double sink, and a kitchen requires making about 20 separate cuts. Thus, for a 100-unit apartment complex, typical plumbing installations would require making 2,000 or more separate cuts in copper tubing.

A traditional method of cutting copper tubing which is still in use consists of using a standard hacksaw to cut tubing to a length required for connecting the tubing to a faucet or other such fixture. A disadvantage of this method is that it is relatively slow, and typically results in a rough, non-square severed cut edge which can make connecting the cut edge of the tubing to a fixture problematic.

Other prior art methods of cutting copper tubing and similar tubular members employ a device which is clamped to a length of pipe or tubing with a screw clamp arrangement, and rotated multiple times around the circumference of the tubing. The device has a cutting blade which presses against the outer circumferential wall surface of the tubing, eventually severing the tubing to a required length. This method, while achieving cleaner, squarer cuts than a hacksaw is substantially time consuming.

In response to the above-described limitations of prior art tubing cutting methods and apparatus, the present inventor invented and disclosed in U.S. Pat. No. 7,845,080 a tubing cutting apparatus which includes a rotary cutting mechanism that has an open area for receiving a length of tubing and has a cutting head provided with a cutting blade for engaging the tubing. The cutting mechanism is powered by rotary power source such as a hand-held power tool, or by a self-contained drive motor. The apparatus includes a gear system for coupling rotary power from a rotary power source to the cutting mechanism and thereby rotating the cutting head and blade about a length of tubing. One embodiment of the disclosed apparatus includes a clamp comprising a slotted tubular leaf spring which protrudes from a handle case of the apparatus in longitudinal alignment with an open slotted area of the cutting mechanism. The apparatus clampingly engages a length of tubing to be cut by pushing opposed flanged edges of the leaf spring against the length of tubing, thus causing the edges to be pried apart against tension exerted by the spring. The edges than spring back to grip the tubing. This arrangement facilitates use of the apparatus in locations with limited accessability, such as within a space behind a wall board of a structure.

The tubing cutting apparatus disclosed in U.S. Pat. No. 7,845,080 provides other substantial advantages over prior art tubing cutting tools. For example, the tubing cutter apparatus disclosed in U.S. Pat. No. 7,845,080 can be positioned and secured in place on a length of tubing, and used to make a clean, square, accurately located severing cut in the tubing, in a much shorter time than prior art cutting tools which require manual clamping operations. However, the present inventor has perceived the need for another type of tubing cutter apparatus which could be operated by hand power alone.

An apparatus powered by hand would be useful in remote areas which do not have a convenient source of electrical power or pneumatic power supplied by pressurized air. Also, it would be desirable to have a tubing cutter tool which was not electrically powered and could thus be used in hazardous locations containing combustible liquids or vapors without the possibility of an electric spark from a drive motor igniting a fire. Moreover, for some applications, it would be desirable to provide a tool for cutting tubular workpieces in which functions of providing a handle for holding the tool, and a mechanism for firmly gripping a length of tubing which was being cut by the tool, could be combined into a single structure.

It would also be desirable to provide a tubing cutter tool which afforded the capability to a workman to readily adjust the number of rotations of a rotatable cutter head to the minimum number required to sever a length of tubing. Prior art powered tubing cutter tools typically are operated in a mode which causes a cutter head of the tool to rotate more than a minimum number to turns around the circumference of a tube, to ensure that a complete severing cut is made. The additional number of often unneeded turns requires additional valuable time which could be saved by a manually operated tubing cutter tool which a workman could readily operate in a mode in which a cutting head was rotated just a sufficient number of turns to cleanly sever a length of tubing but without any additional time consuming rotations of the cutting head. The foregoing considerations were motivating factors for the present invention.

OBJECTS OF THE INVENTION

An object of the present invention is to provide a portable hand-held tool for cutting tubular workpieces such as copper tubing, which includes a rotating cutting head that is driven by a hand-operated pull-cord mechanism.

Another object of the invention is to provide a portable hand-held tubing cutter tool which has a clamping handle that facilitates using a single hand to both hold the tool and clampingly engage a length of tubing to the cut.

Another object of the invention is to provide a pull-cord powered portable hand tool for cutting tubing, which has a handle that has a handle grip for supporting the tool and clamping jaws for clamping the tool to a length of tubing to be cut when the handle is grasped and squeezed.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated the present invention comprehends a hand-held portable tool for cutting tubular workpieces such as copper tubing used in plumbing systems, which include a clamping handle and a novel pull-cord powering mechanism.

A basic embodiment of a portable hand held tubing cutter tool according to the present invention includes a pull-cord drive wheel mechanism for converting linear pulling power exerted by a workman into rotary motion of a drive wheel pulley. The tool includes a gear drive mechanism mounted on top of the pull-cord drive wheel mechanism, and a cutting mechanism including a crescent-shaped, slotted cutting head mounted on top of the gear drive mechanism. Rotary power generated by the pull-cord drive wheel mechanism in response to a workman's brisk pulling on a handle at the outer end of a pull-cord wrapped around a drive wheel is coupled through the gear drive mechanism to the cutting mechanism. Rotation of a blade in the cutting mechanism in contact with the outer circumferential surface of a length of tubing positioned in the slot of the cutter head is effective in severing the tubing.

The pull-cord drive wheel mechanism includes a spirally wound, flat tension spring which is similar to a clock main spring, and is effective in rotating the drive wheel in an opposite direction to thus retract and re-wind the pull-cord around the drive wheel pulley, when tension is released on the drive cord pull handle.

The tubing cutter tool according to the present invention includes a clamping handle which protrudes downwardly from the gear-drive mechanism. The clamping handle includes a pair of longitudinally disposed generally semi-cylindrically-shaped handle shells which are pivotable apart to form an open space for receiving a length of tubing. The handle is moved laterally towards a vertically disposed length of tubing to encompass a length of tubing in the open space between the handle shells, which are then pivoted towards one another to form a cylindrical space in which the tubing is located. Opposed inner concave sides of the handle shell exert a compressive gripping force on the tubing when the outer surface of the handle shells are grasped in the palm of a workman's hand.

An alternate embodiment of a portable tubing cutter tool with clamping handle according to the present invention includes a gear drive mechanism which has rotary power input socket that is rotatable by a complementary shaped drive pin which is inserted into the socket and rotated by of an external rotary power source such as a power drill.

BRIEF DESCRIPTION OF THE DRAWINGS

FIG. 1 is a perspective view of a pull-cord operated tubing cutter tool with clamping handle according to the present invention.

FIG. 2 is a transverse sectional view of a compression grip clamping handle of the tool of FIG. 1.

FIG. 4B is an exploded view of the gear drive mechanism of FIG. 3.

FIG. 5 is a part side elevation, part medial longitudinal sectional view of the tool of FIG. 1 taken in the direction indicated by the line 5-5.

DESCRIPTION OF THE PREFERRED EMBODIMENTS

Figure 3:
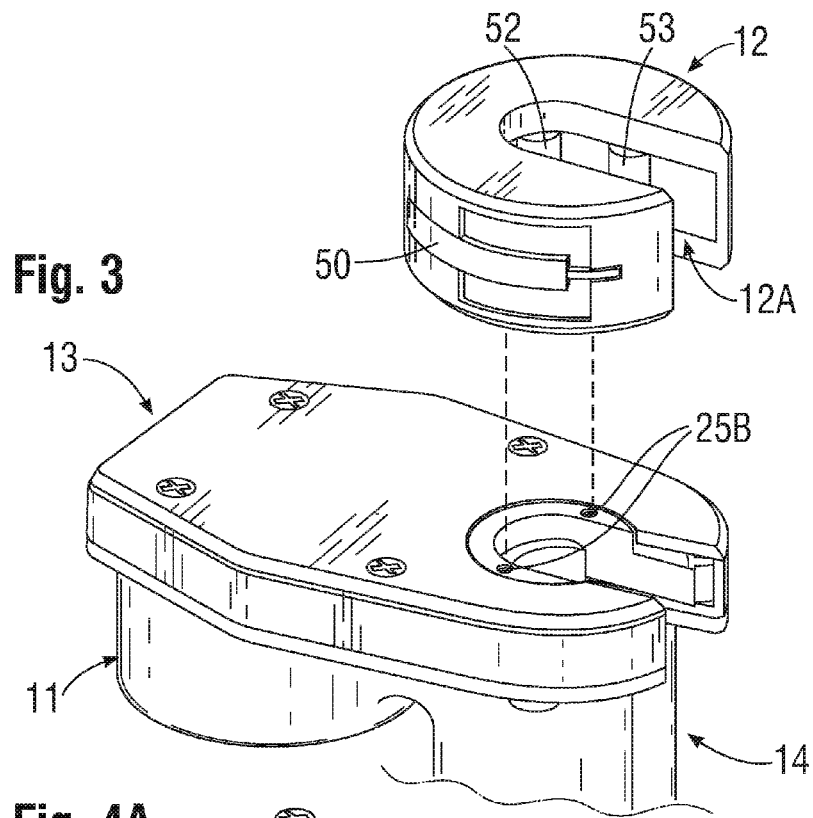
FIG. 3 is a fragmentary exploded view of the tool of FIG. 1 showing the mounting of the cutting head of the tool of FIG. 1 to the gear mechanism thereof.

FIGS. 1-10 illustrate embodiments of a tubing cutter with a clamping handle according to the present invention which are powered by a pull-cord mechanism. FIG. 11 illustrates another embodiment of a tubing cutter with a clamping handle according to the present invention, which is powered by an external rotary power source such as an electric drill.

Referring to FIGS. 1 and 2, a pull-cord operated tubing cutter 10 with clamping handle according to the present invention may be seen to include a pull-cord drive wheel mechanism 11 for converting linear pulling power to rotary drive power, a gear drive mechanism 13, rotatable by the pull-cord drive wheel mechanism, a crescent-shaped cutter head 12 mounted on top of and driven by the gear drive mechanism and an elongated clamping handle 14 which is depends perpendicularly downwards from the gear drive mechanism, in coaxial alignment with the cutter head. As shown in FIGS. 1-5, gear drive mechanism 13 has an elongated flat base plate 15. Clamping handle 14 protrudes downwards from a front part of the lower surface of the base plate 15, and pull-cord drive mechanism 11 protrudes downwardly from a rear part of the lower surface of the base plate 15.

As may be seen best by referring to FIGS. 1, 2 and 5, clamping handle 14 is constructed of two generally semi-cylindrically-shaped vertically elongated shells 16 and 17 including a fixed handle shell 16 that is mounted fixedly to the lower surface of gear mechanism base plate by a first, upper attachment pin 18. Handle 14 includes a second, pivotable handle shell 17 which has a shape that is generally mirror symmetric to that of fixed handle shell 16, through a vertical longitudinal medial plane of the handle. Pivotable handle shell 17 is pivotably mounted at an upper end thereof to a lower part of upper attachment pin 18, and at a lower end thereof to the lower end portion of fixed handle shell 16 by a second, vertically disposed, lower pivot pin 19.

As may be seen best by referring to FIG. 2, fixed handle shell 16 and pivotable handle shell 17 have disposed longitudinally or vertically through their lengths elongated semi-circular cross section bores 21, 22 to which are secured elongated semi-circular shaped cylindrical elastomeric or friction pads 23, 24.

As shown in FIGS. 1 and 2, when handle shells 16 and 17 are pivoted towards one another and a compressive force exerted on the outer surfaces of the handle shells by being gripped in the palm of a person's hand, a compressive gripping force may be exerted on the outer circumferential surface of a length of tubing T or pipe to thus retain the tool 10 in a fixed position relative to the tubing, as shown in FIG. 1.

Optionally, as shown in FIG. 2, the outer vertically disposed longitudinal edges of handle shells 16 and 17 opposite pivot pins 18 and 19 may have formed therein tongue-and-groove type interlocking edges 16A, 17A, to help maintain a compressive force on a pipe, length of tubing, or other such tubular workpiece.

As shown in FIG. 5, the rear longitudinally disposed surface of handle 14 preferably has a curved shape to facilitate grasping the handle in a workman's hand, and includes a convex arcuately curved elongated center section 14A, and an arcuately inwardly curved upper and lower end sections 14B, 14C.

Figure 4A:
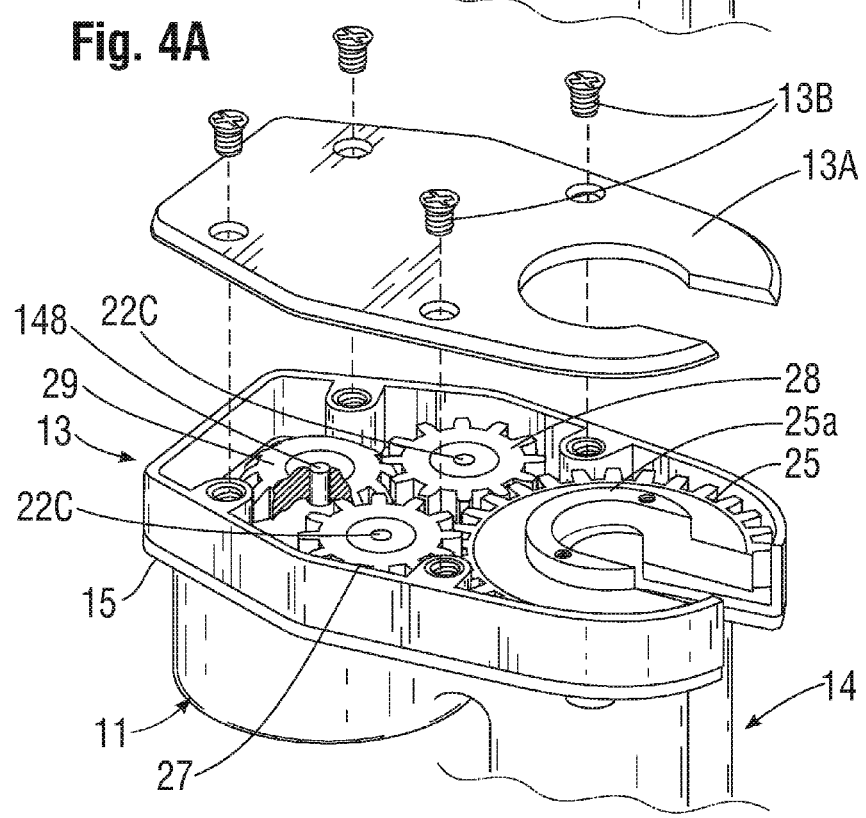
FIG. 4A is a fragmentary view of the tool of FIG. 1, showing a gear drive mechanism thereof with its cover plate removed.

Referring to FIGS. 3, 4A and 4B, it may be seen that gear drive mechanism 13 includes in planar arrangement and sequence of connection, a C-shaped gear 25, a pair of intermediate circular gears 27, 28 that do not engage each other, and a circular driving gear 29. Both intermediate gears 27, 28 engage C-shaped gear 25 and on the opposite side engage driving gear 29. In this manner driving gear 29 engages and simultaneously rotates both intermediate gears 27, 28 and in turn intermediate gears 27, 28 engage and simultaneously rotate C-shaped gear 25.

Two intermediate gears 27, 28 are required because for some rotational positions, one or the other of intermediate gears 27, 28 will be in the gap 42 in the C-shaped gear defined by shoulders 26A, 26B and hence will be out of contact with C-shaped gear 25. Thus, intermediate gears 27, 28 are positioned so that at least one of these gears is always in contact with the C-shaped gear 25 such that there is no break in the rotation of C-shaped gear 25. C-shaped gear 25 has a raised portion 25a for attachment to cutting head 12 as will be described.

As shown in FIGS. 4A, 4B and 5, base plate 15 of gear drive mechanism 13 has two mounting posts 22c, which rotatably support intermediate gears 27, 28 to base plate 15. Driving gear 29 is pinned to the shank of a drive pin 148 which protrudes upwardly from pull-cord drive wheel mechanism 11 through a hole in the base plate 15 of the gear drive mechanism. Gear drive mechanism 13 has a cover plate 13A which is secured to base plate 15 by screws 13B, thereby capturing gears 25, 27, 28, and 29. A semi-cylindrical bearing sleeve 22a is vertically attached to base plate 15 and when the cutting apparatus is assembled extends upward through the gap 42 of C-shaped gear 25 to provide a bearing about which gear 25 rotates.

As may be envisioned by referring to FIGS. 1 and 3-4B, rotation of circular driving gear 29 causes cutter head 12 to rotate in contact with the outer circumferential wall surface of a tube T disposed through a longitudinally disposed slot 12A in the cutter head to thereby cause a cutting blade which is urged through a transversely disposed slot in an inner wall of slot 12A to form a circular cut through the tube. Cutter head 12 is attached to C-shaped gear 25 by screws (not shown) which protrude downwards from cutter head 12 and are received in threaded bores 25B in the upper surface of the C-shaped gear 25. The construction and operation of gear mechanism 13 and cutter head 12 are exactly similar to those of the gear system 21 and cutter head 12 described in U.S. Pat. No. 7,845,080, the description of which is hereby incorporated in its entirety into the present specification.

Figure 5A:
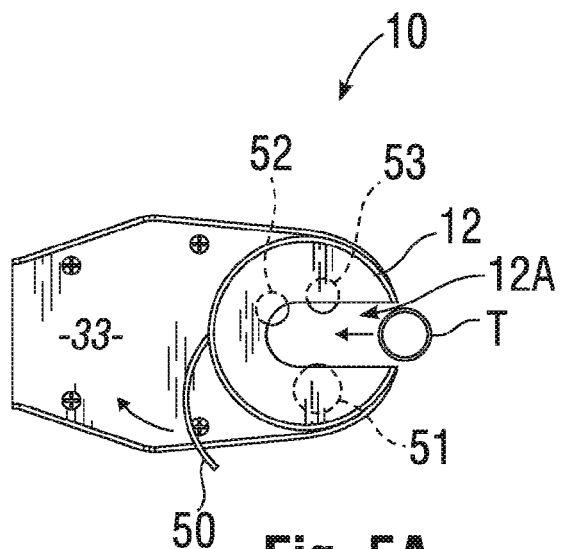
FIG. 5A is a fragmentary upper plan view of the tool of FIG. 1 showing the cutter head of the tool engaging a length of tubing to be cut.
Figure 5B:
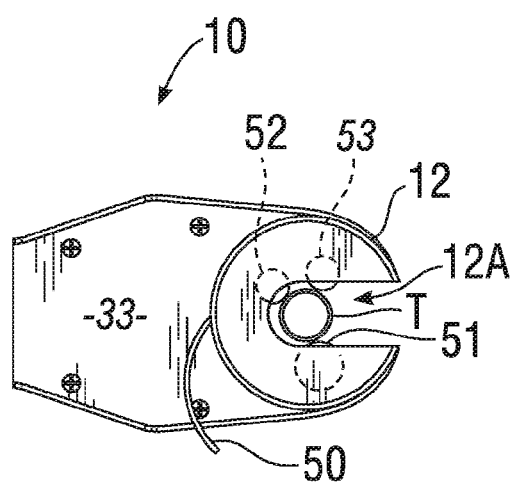
FIG. 5B is a view similar to FIG. 5A, showing the cutter head positioned about the tubing in preparation for cutting the tubing.
Figure 5C:
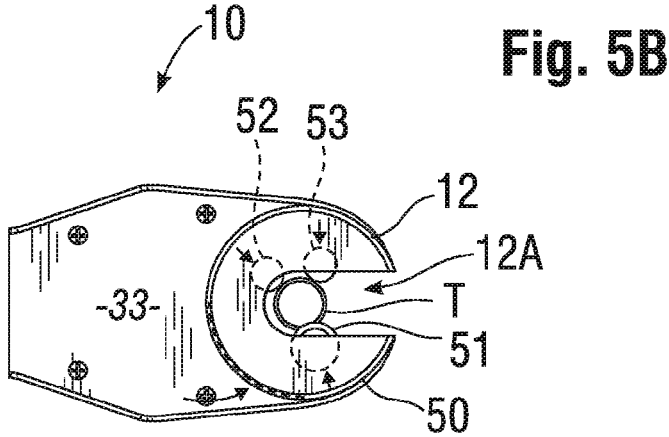
FIG. 5C is a view similar to FIG. 5B, showing the cutting blade of the cutter head contacting the tubing prior to orbiting the tubing to cut the tubing.

FIGS. 5A-5C illustrate the manner in which the cutting head 12 is positioned onto tubing T. FIG. 5A indicates tubing T closing, as indicated by the arrow, with the receiving slot 12A of the cutting head 12. A locking lever 50 is in the open position for allowing spring urged recession of the rotatable cutting blade 51 (shown in phantom in FIG. 5A). Shown partially in phantom are fixed position rotatable support rollers 52, 53 for positioning tubing T within the cutting head 12 and facilitating easy rotation of cutting head 12 about tubing T during the cutting operation. FIG. 5B shows tubing T properly positioned in cutting head 12 against support rollers 52, 53 but not yet clamped by cutting blade 51. FIG. 5C shows clamping of tubing T by cutting blade 51 whereby, in cooperation with support rollers 52, 53, tubing T is firmly positioned for cutting. Cutting blade 51 includes spring means and cam configuration, the spring means urging recession of cutting blade 51 away from tubing T when lever 50 is in the open position; the cam configuration overcoming the spring means when lever 50 is in the closed position to force penetrating contact of the cutting blade 51 with the tubing T.

The structure and operation of pull-cord drive wheel mechanism 11 of tubing cutter 10 may be best understood by reference to FIGS. 1 and 5-9. As shown in FIGS. 1 and 5-9, pull-cord power drive wheel mechanism 11 includes a housing 100 which has generally the shape of a short, circular cross-section cylindrical box that has a circular base plate 101 and a circular cross-section, cylindrically-shaped, uniform thickness flange wall 102 which protrudes perpendicularly upwards from the outer circumferential edge of the base plate.

Housing 100 of drive wheel mechanism 11 has between base plate 101 and cylindrical flange wall 102 a hollow cylindrically-shaped interior space 103 which contains a rotatable circular cross section drum or pulley 104. Pulley 104 has at a lower or base end thereof a transversely disposed annular ring-shaped flange or lower pulley sheave 105 which protrudes radially outwards from a vertically disposed, longitudinally centrally located cylindrically-shaped central body 106 of the pulley. Pulley 104 also has at an upper end thereof an annular ring-shaped flange or upper pulley sheave 107. Upper pulley sheave 107 has a size and shape similar to that of lower pulley sleeve 105, and also protrudes radially outwards of central body 106 of the pulley.

Figure 7:
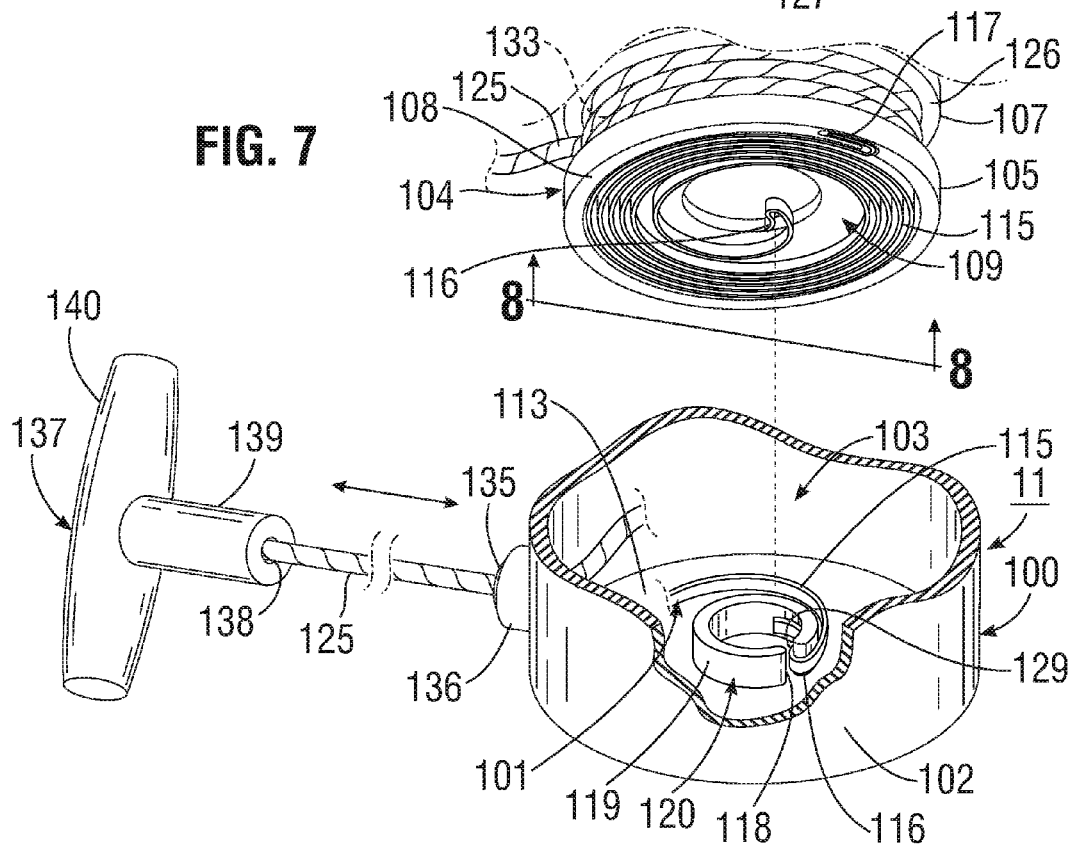
FIG. 7 is an exploded perspective view of the pull-cord drive wheel mechanism of FIG. 6.

As may be seen best by referring to FIGS. 5 and 7, pulley 104 has protruding perpendicularly upwards from a lower face 108 thereof into central body 106 thereof a circular blind bore 109 which has a diameter that is slightly less than that of cylindrical central body 106 of the pulley. Bore 109 terminates in an upper horizontally disposed end wall 110, and forms with the upper surface 113 of pulley housing base plate 101 a hollow cylindrically-shaped space 114.

Figure 8:
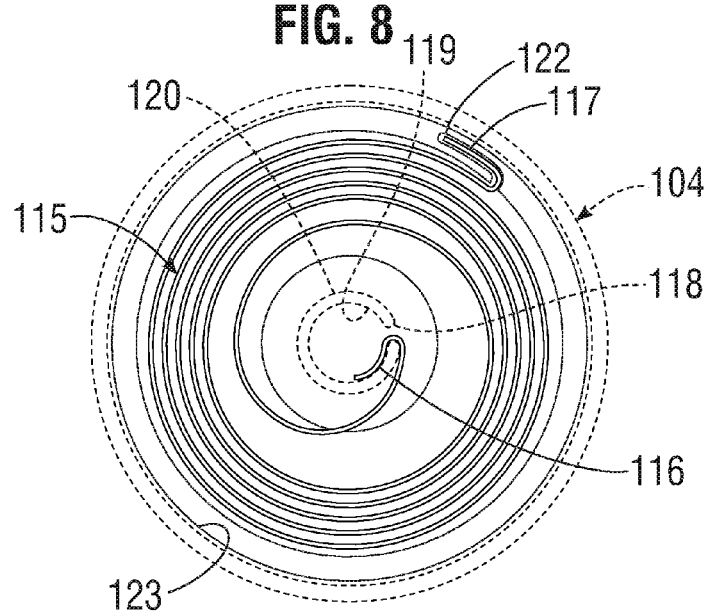
FIG. 8 is a fragmentary lower view of the pull-cord drive wheel mechanism of FIG. 7, showing a torsion recoil spring thereof.

As shown in FIGS. 5, 7 and 8, hollow cylindrically-shaped space 114 within pulley 104 contains a flat, spirally wound torsion spring 115. Torsion spring 115 has flat, vertically oriented coils, which terminate at a radially inwardly located end thereof in a folded-over inner tang 116, and at a radially outwardly located end thereof in a folded-over, outer tang 117.

As shown in FIGS. 7 and 8, inner tang 116 at the inner end of torsion spring 115 is hooked into and retained by a vertical slot 118 in the wall 119 of a small diameter cylindrical flange 120 which protrudes perpendicularly upwards from the center of the upper surface 113 of housing base plate 101. As shown in FIG. 8, outer tang 117 of torsion spring 115 engages a groove 122 in the inner circumferential wall surface 123 of pulley 104.

Figure 6:
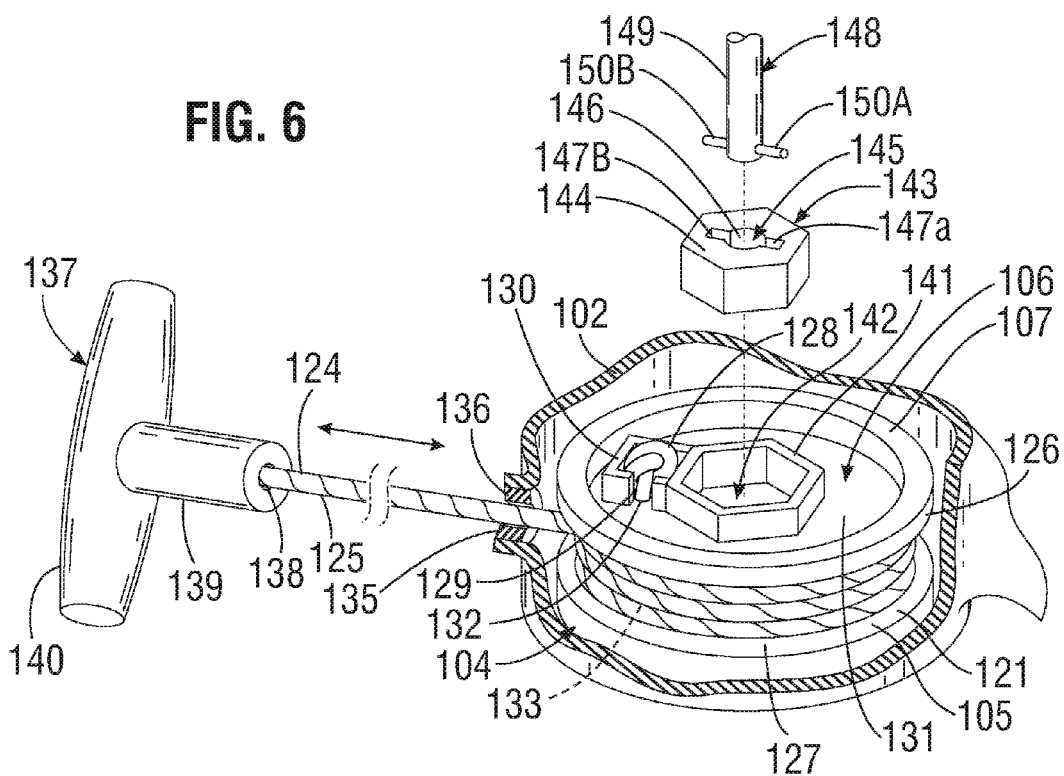
FIG. 6 is a partly sectional exploded perspective view of a pull-cord drive wheel mechanism of the tool of FIG. 1.
Figure 9:
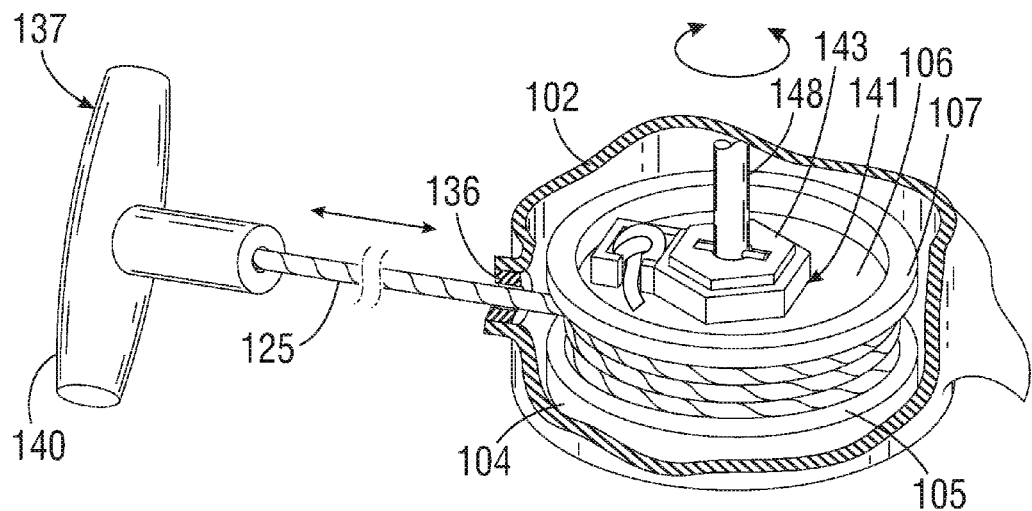
FIG. 9 is a partly sectional perspective view of the pull-cord drive wheel mechanism of FIG. 6, showing a dog-bone gear drive shaft thereof engaged by a dog-bone wheel drive nut.

Referring now to FIGS. 1, 6 and 9, it may be seen that pull-cord power drive mechanism 11 of tool 10 includes a pull-cord 125 which is wrapped around the outer circumferential surface 133 of central body 106 of pulley 104 located between inner facing, opposed upper and lower horizontally disposed annular ring-shaped shoulders 126, 127 of upper and lower pulley sleeves 107 and 105, respectively.

As shown in FIGS. 5, 6 and 9, an inner knotted end 128 of pull-cord 125 is secured in a notch 129 located in a pull-cord retainer flange 130 which protrudes upwardly from the upper circular end wall 131 of the central body 106 of pulley 104. Pull-cord 125 pays radially outwards from notch 129, and vertically downwards through a hole 132 in upper end wall 131 of pulley 104, and thence is wrapped spirally around the outer circumferential wall surface 133 of central body 106 of the pulley.

As is shown in FIG. 6, pull-cord 125 has an outer end portion 124 that protrudes radially outwards from the hollow interior space 103 of pull-cord housing 100 through the bore 135 of bushing 138 which protrudes radially outwardly from the housing and communicates with the hollow interior space of the housing. As is also shown in the figures, pull-cord 125 is attached to an outer end of a transversely disposed T-shaped pull handle 137 which receives the end of the pull-cord in a bore 138 disposed through a centrally located outwardly longitudinally disposed leg 139 of the handle, which has a transversely disposed hand grip 140.

FIGS. 3-6 illustrate structural and functional details of how a linear putting force exerted on handle 140 causes drive pulley 104 and drive gear 29, and hence cutter head 12 to rotate.

As may be understood by referring to FIGS. 5 and 6, grasping hand grip 140 of handle 137 and pulling the handle and attached cord 125 wrapped around pulley 104 causes the pulley to rotate. As shown in the figures, pulley 104 has mounted on the horizontal upper surface 131 thereof a hexagonally-shaped drive socket 141 which has therein a hexagonally-shaped recess 142. Tool 10 includes a hexagonally-shaped "dog-bone" drive nut 143 which is of an appropriate size to be received vertically downwards into recess 142 of drive socket 141.

As may be seen best by referring to FIG. 6, drive nut 143 has protruding vertically downwards from an upper surface 144 thereof a bore 145 having a central circular cross-section part 146 and a pair of radially opposed slots 147a, 147b which protrude radially outwards from diametrically opposed sides of the central circular cross-section bore. Bore 145 of drive nut 143 receives vertically downwardly therein the drive pin 148 which has a central circular cross-section shank 149 and a pair of radially outwardly protruding pins 150A, 150B, which are of an appropriate size and shape to fit conformally downwards into the central circular part of bore 146 in drive nut 143, and the radiating opposed slots 147A and 147B in the drive nut.

As may be seen best by referring to FIGS. 5 and 4, drive pin 148 is pinned at an upper end thereof to drive gear 29 of gear mechanism 11.

FIGS. 1, 2 and 5 illustrate how pull-cord operated tubing cutter tool 10 is used to make a severing cut through the wall of a tubular workpiece such as a copper pipe or tube T.

As shown in phantom in FIG. 2, pivotable handle shell 17 of clamping handle 14 of tool 10 is pivoted away from fixed handle shell 16 to thereby form between inner opposed concave edges of the two handle shells a longitudinally elongated concave space for receiving therein a length of tubing T. Then, as shown in FIG. 1, tool 10 is moved laterally towards a length of tubing T to be cut, the tubing centered within the bore B formed between inner concave surfaces of handle shells 16 and 17, and pivotable handle shell 17 pivoted towards fixed handle shell 16. Handle 14 is then grasped in the palm of a workman and squeezed as shown in FIG. 1, thus causing the inner concave surfaces of the handle shells to exert a compress gripping force on the outer circumferential wall surface of tubing T.

Next, as shown in FIG. 1, hand grip 140 of pull-cord handle 137 is grasped in the other hand of the workman, and pulled briskly outwards. Radially outward motion of pull-cord 125 from pull-cord housing 100 causes pulley 104 to rotate. Rotation of pulley 104 in turn causes drive shaft 148 and thus drive gear 29 to rotate, thus causing cutter 12 to rotate around and cut through the wall of tubing T.

When tensional pulley force on pull-cord handle 137 is released, tension in torsion spring 115 causes pulley 104 to rotate in a reverse direction, thus retracting pull-cord 125 into housing 100 thereby rewinding the cord on the pulley, and readying tool 10 to be used for another cutting operation.

Figure 10:
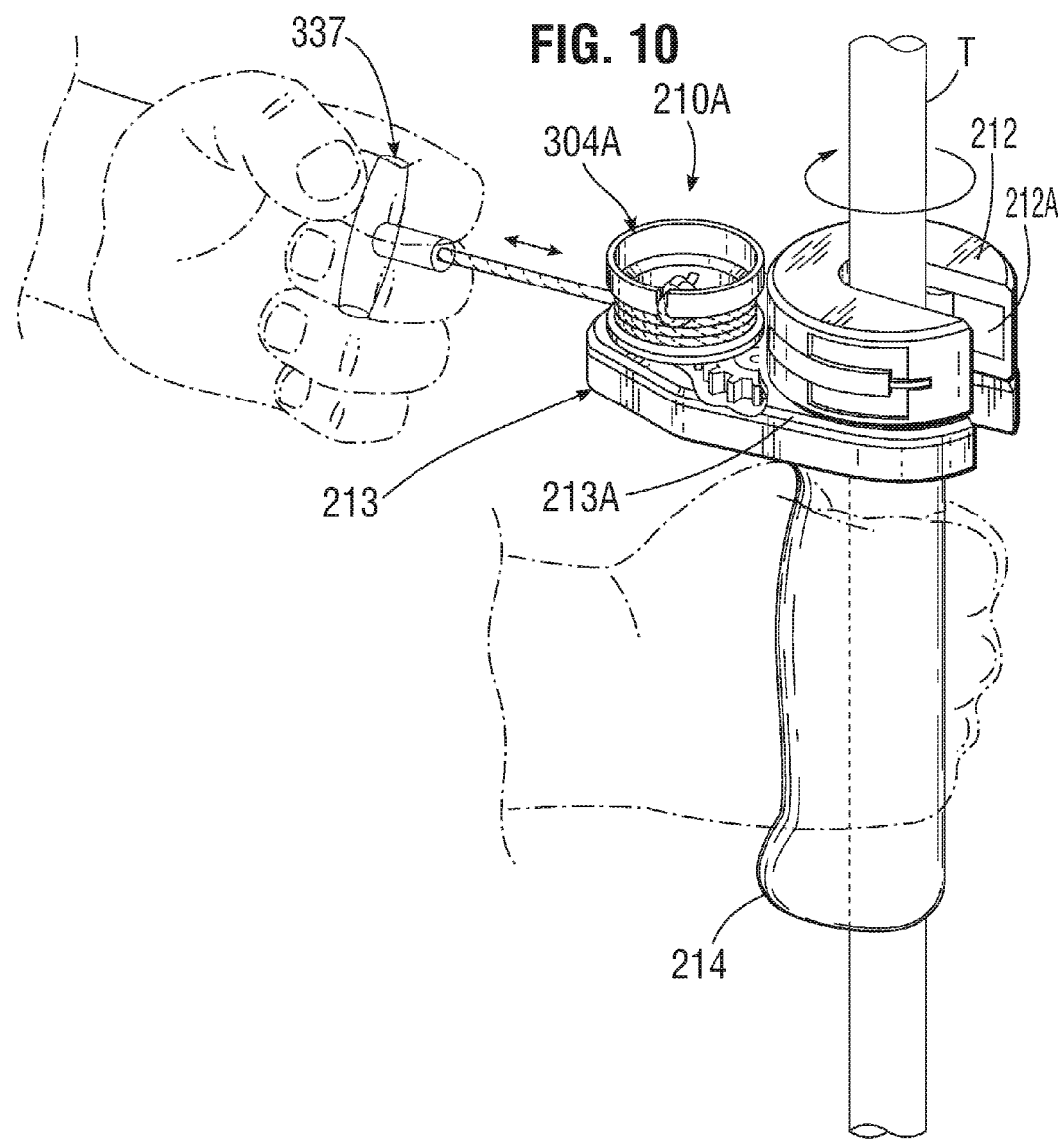
FIG. 10 is a perspective view of an alternate embodiment of the tool of FIG. 1.
Figure 11:
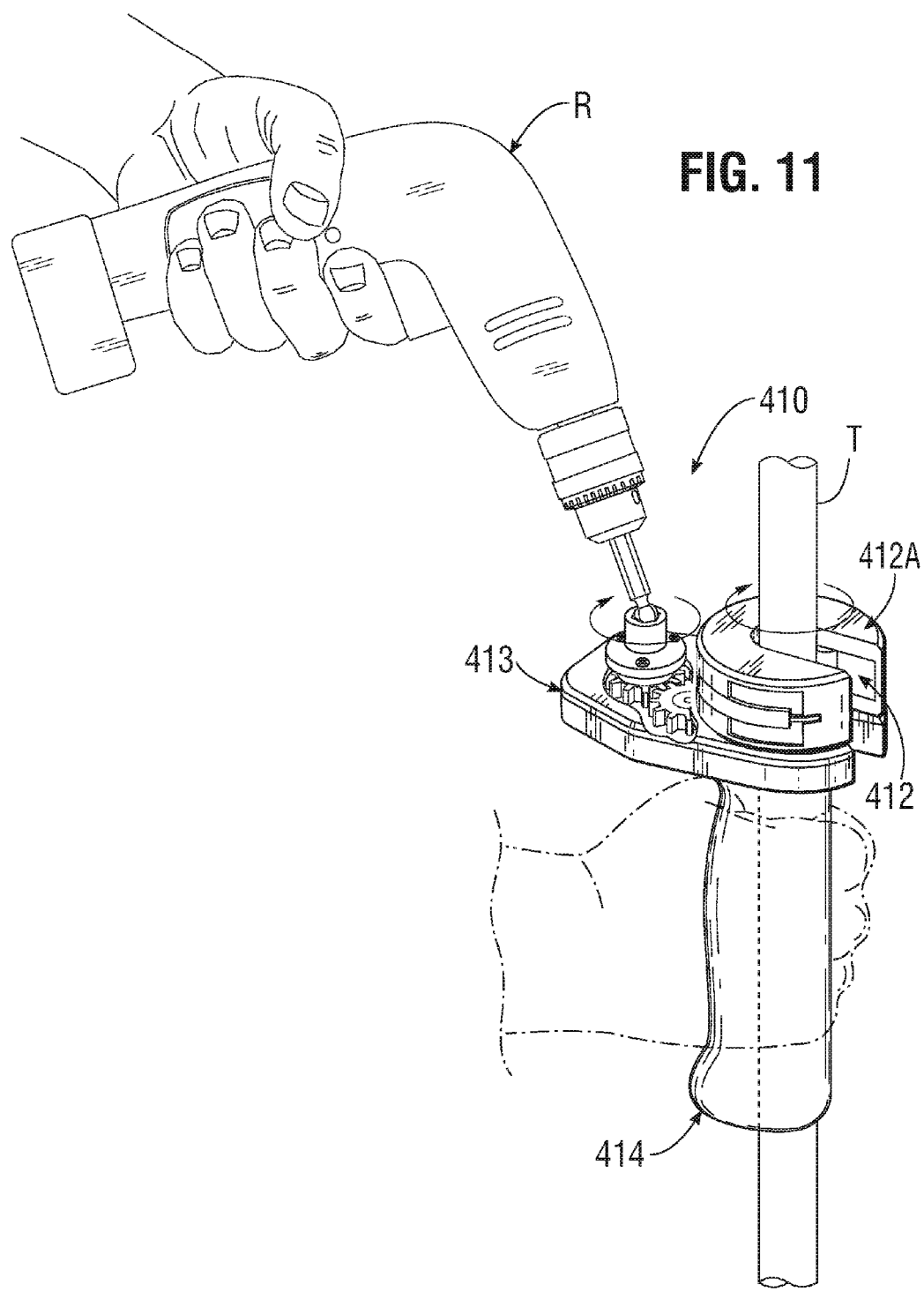
FIG. 11 is a perspective view of another embodiment of the tool of FIG. 1.

FIG. 10 illustrates an alternate embodiment 210A of a pull-cord operated tubing cutter according to the present invention, in which the drive pulley 304A is mounted on the upper surface of upper cover plate 213A of a gear drive mechanism 213.

FIG. 11 illustrates another embodiment 410 of the tubing cutter with clamping handle according to the present invention which has a gear mechanism 413 that may be rotatably driven by an external rotary power apparatus R such as an electric drill. The structure and function of the gear mechanism 413 and cutter 412 of tubing cutter 410 are exactly analogous to those of corresponding elements of the tool shown in FIGS. 1 and 2 of U.S. Pat. No. 7,845,080.

Optionally, alternate embodiment 210A shown in FIG. 10 may be modified by providing it with a removable or preferably, a disengageable retractor spring, and a centrally located drive socket which protrudes upwardly from drive pulley 304A and is engageable by a rotary power source, in an arrangement of the type shown for embodiment 410 in FIG. 11. With this modified construction, the alternate embodiment of the tubing cutter 210A shown in FIG. 10 can be operated alternatively by a pull cord or external rotary power source, at the option of a user of the cutter.

What is claimed:

1. A tube cutting tool comprising:
    a gear housing with an input opening and an output opening;
    a gear mechanism housed in the gear housing, the gear mechanism including an input gear and an output gear, the output gear having a first opening;
    a drive wheel housing extending from the gear housing, the drive wheel housing having an aperture;
    a pull-cord operated drive wheel mechanism which is partially housed in the drive wheel housing and is in communication with the aperture, the pull-cord operated drive wheel mechanism being rotatably connected to the input gear via the input opening;
    a generally cylindrical shaped rotary cutting head extending from the gear housing, the cutting head having a second opening which is rotatably connected to the output gear via the output opening, the cutting head having at least one cutting blade in communication with the second opening;
    a clamping handle including a first longitudinally elongated semi-cylindrical shaped handle shell fixed to the gear housing and a second longitudinally elongated semi-cylindrical shaped handle shell pivotally mounted to the first shell, the second shell being pivotable between an open position and a closed position, in which the shells define a third opening; and
    the output opening, the first opening, the second opening, and the third opening are axially aligned so as to define a combined opening to receive a tube to be cut, when the tube is received in the combined opening, the shells acting as a clamp for the tube and the pull-cord operated drive wheel mechanism is operated to rotate, via the input and output gears, the cutting head which cuts the tube via the at least one cutting blade.

2. The tube cutting tool of claim 1 comprising: the pull-cord operated drive wheel mechanism further comprising a pulley housed in the drive wheel housing and a flexible pull cord having an inner end fixably attached to the pulley at a location spaced radially from a central longitudinal axis of the pulley, an outer end terminated in a pull cord handle, and a medial length extending from the pull cord handle through the aperture to be wrapped spirally around an outer circumferential surface of the pulley.

3. The tube cutting tool of claim 2 comprising: a retractor spring attached between the drive wheel housing and the pulley allowing for a torque to be exerted on the pulley in opposition to a torque being exerted on the pulley by pulling on the pull cord handle and allowing for re-winding of the medial length of the pull cord on the pulley upon release of the pulling torque.

4. The tube cutting tool of claim 3 wherein the retractor spring is defined as a spirally wound flat tension spring having a radially inwardly located tang fixedly attached to the drive wheel housing and a radially outwardly located tang fixedly attached to a radially outwardly located part of the pulley.

5. The tube cutting tool of claim 1 wherein at least one of the shells has on an inner concave surface thereof a friction pad for gripping the tube.

6. The tube cutting tool of claim 1 wherein the gear housing further comprises a semi-cylindrical bearing sleeve defining an end portion of the output opening and the bearing sleeve being received in the first opening of the output gear.

7. The tube cutting tool of claim 1 wherein the output gear having a semi-cylindrical raised portion extending through the output opening and defining the connection between the cutting head and the output gear.

8. The tube cutting tool of claim 1 wherein the gear mechanism further comprises at least one intermediate gear connecting the input gear to the output gear.

9. The tube of claim 1 wherein a shank extending through the input opening and being connected to the pull-cord operated drive wheel mechanism at one end and to the input gear at another end defines the connection between the pull-cord operated drive wheel mechanism and the input gear.

* * * * *